United States Patent
Marsch et al.

(10) Patent No.: US 10,830,348 B2
(45) Date of Patent: Nov. 10, 2020

(54) DEVICE AND METHOD FOR CONTROLLING A HYDRAULIC MACHINE

(71) Applicant: Danfoss Power Solutions GmbH & Co. OHG, Neumunster (DE)

(72) Inventors: Suenje Marsch, Ehndorf (DE); Bernd Hames, Henstedt-Ulzburg (DE); Michael Hein, Neumunster (DE); Arne Streblau, Nortorf (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 697 days.

(21) Appl. No.: 15/145,864

(22) Filed: May 4, 2016

(65) Prior Publication Data

US 2016/0341223 A1 Nov. 24, 2016

(30) Foreign Application Priority Data

May 18, 2015 (DE) .................... 10 2015 209 074

(51) Int. Cl.
*F16H 61/421* (2010.01)
*F16H 61/423* (2010.01)
(Continued)

(52) U.S. Cl.
CPC ......... *F16H 61/421* (2013.01); *F16H 61/423* (2013.01); *F15B 2211/251* (2013.01);
(Continued)

(58) Field of Classification Search
CPC .... F16H 61/421; F16H 61/423; F16H 61/425; F16H 61/427; F16H 61/4026
(Continued)

(56) References Cited

U.S. PATENT DOCUMENTS 4,040,254 A * 8/1977 Knapp ................ B62D 11/183
180/6.48
4,191,094 A 3/1980 Flippo et al.
(Continued)

FOREIGN PATENT DOCUMENTS

CN 1695017 A 11/2005
CN 101094999 A 12/2007
(Continued)

*Primary Examiner* — Abiy Teka
*Assistant Examiner* — Michael Quandt
(74) *Attorney, Agent, or Firm* — McCormick, Paulding & Huber PLLC

(57) ABSTRACT

The invention relates to a hydraulic machine, in particular to a hydraulic motor with two working lines, from one of which a high pressure line and from the other one a low pressure line is branched off. An electronic control unit and a servo displacement unit are provided to control the displacement of the displacement volume of a drive mechanism of the hydraulic machine, wherein the displacement volume can be determinated by the displacement of a servo piston within the servo displacement unit. For this, the servo piston can be loaded at least on one side via a servo pressure line with hydraulic fluid under servo pressure, wherein the servo pressure level can be adjusted by a control spool arranged moveable within a control valve. For this, hydraulic fluid from the low pressure line or, perhaps, from the high pressure line is guidable via the control valve to the servo pressure line if a suitable control signal is available at a switching valve.

8 Claims, 6 Drawing Sheets

(51) Int. Cl.
*F16H 61/4017* (2010.01)
*F16H 61/4026* (2010.01)

(52) U.S. Cl.
CPC ... *F15B 2211/252* (2013.01); *F15B 2211/763* (2013.01); *F16H 61/4017* (2013.01); *F16H 61/4026* (2013.01)

(58) Field of Classification Search
USPC .................................................. 60/445, 450
See application file for complete search history.

(56) References Cited

U.S. PATENT DOCUMENTS

| | | | |
|---|---|---|---|
| 4,487,109 A | 12/1984 | Burandt et al. | |
| 4,569,096 A * | 2/1986 | Kassai | E01H 1/053 15/83 |
| 5,046,926 A | 9/1991 | Deininger et al. | |
| 5,095,698 A | 5/1992 | Deininger | |
| 5,390,759 A * | 2/1995 | Gollner | F16H 61/421 180/307 |
| 6,915,631 B2 * | 7/2005 | Kado | F16H 61/438 60/394 |
| 8,443,596 B2 | 5/2013 | Ramm | |
| 2015/0033728 A1 | 2/2015 | Glaz et al. | |

FOREIGN PATENT DOCUMENTS

| | | | |
|---|---|---|---|
| CN | 104276040 A | 1/2015 | |
| DE | 3307570 A1 | 10/1983 | |
| DE | 3925297 A1 | 2/1991 | |
| DE | 10 2009 005 768 A1 | 7/2010 | |
| DE | 102009005768 A1 | 7/2010 | |
| DE | 10 2009 021 866 A1 | 11/2010 | |
| DE | 102009021866 A1 | 11/2010 | |
| EP | 1894765 A2 * | 3/2008 | ......... F16H 61/4192 |

* cited by examiner

DEVICE AND METHOD FOR CONTROLLING A HYDRAULIC MACHINE

CROSS REFERENCE TO RELATED APPLICATION

Applicant hereby claims foreign priority benefits under U.S.C. § 119 from German Patent Application No. DE 102015209074.4, filed on May 18, 2015, the content of which is incorporated by reference herein.

TECHNICAL FIELD

The invention relates to a hydraulic machine, for example a hydraulic motor, which is operated by means of two working lines conducting hydraulic fluid, in particular by means of a high pressure line and a low pressure line. The displacement volume of a drive mechanism of the hydraulic machine is adjustable in a controlled manner by means of a control unit, a control valve and a servo displacement unit; thereby, the displacement volume can be determined by the displacement of a servo piston within the servo displacement unit. For this purpose, hydraulic fluid under servo pressure is provided to the servo displacement unit via a servo pressure line and a control spool arranged movable in a control valve such that the servo displacement unit is able to adjust the displacement volume of the hydraulic machine in a controlled manner.

BACKGROUND

A generic hydraulic machine adjustable in that manner is known from DE 33 07 570 A1, for example. In this document a hydraulic machine designed as a hydraulic motor is described, whose control cylinder is fed with pressure fluid under high pressure via a branch-off line of a working line. The pressure fluid under high pressure is conducted to a servo piston of a servo displacement unit by means of a control piston arranged in the control cylinder, wherein the servo piston is displaceable in two directions, and wherein the servo displacement unit displaces a wobble plate of the hydraulic motor. One of the working lines of the hydraulic motor described in DE 33 07 570 A1 is loaded with pressure fluid under high pressure, whereas the other one serves to discharge hydraulic fluid under low pressure. A change of rotational speed and/or a reversion of rotation of the hydraulic motor shown here, can be effected by adjusting the displacement of the wobble plate. The feeding of the servo cylinder of the hydraulic motor described in U.S. Pat. No. 4,191,094 is effected on the high pressure side of the hydraulic motor, as is the rule. Hydraulic fluid under high pressure is supplied as servo pressure to the servo displacement unit via the control cylinder and is usually provided either directly by the hydraulic pump driving the hydraulic motor or by a separate charge pump or is taken out of the working line conducting high pressure.

The state of the art is disadvantageous in that the servo displacement units of hydraulic motors are always operated with hydraulic fluid under high pressure, and in that the units of hydraulic pumps are usually operated with hydraulic fluid under charge pressure of a charge pump. The level of the high pressure or charge pressure can vary due to changes in performance requirements of the hydraulic machine or due to the adjustment of the corresponding hydraulic machine. Therefore, the control pressure for controlling the displacement volume and the resulting rotational speed of the hydraulic machine depends on the pressure, by which, for example, variations in the displacement speed occur during the regulation of the rotational speed and the torque. Additionally, pressure fluid displaced by the servo displacement unit is often directly discharged to the tank and, therefore, is not available for the preferred closed circuit. This branching-off of high pressure fluid from the circuit additionally signifies a loss of hydraulic energy. Further losses arise from unavoidable leakage in the control system of the hydraulic machine, which are of course greater, the higher the corresponding control system pressure is. These losses reduce the overall efficiency factor of the hydraulic machine.

SUMMARY

Therefore, the invention is based on the problem of providing a hydraulic machine, in particular one of the type mentioned above, and to provide a corresponding method of its operation. By this method the aim is to achieve a control of the displacement volume and the resulting rotational speed of a hydraulic machine that is independent of control pressure variations; furthermore, a maximum high efficiency factor should be achieved in all operational conditions, whereby leakage should be kept to a minimum. A further objective of the invention is to provide a control of a hydraulic machine, with which a quicker adjustment of the displacement volume can be achieved without design changes to the driving mechanism or to the servo displacement unit of the hydraulic machine being necessary. For this purpose, the inventive control should be simple, robust and costeffective in its design and be retrofitable in already existing hydraulic machines.

According to the invention, these problems are solved with a hydraulic motor comprising the features pursuant to the characterizing part of claim 1 in that in a corresponding hydraulic motor hydraulic fluid can be forwarded from the low pressure line to the servo pressure line via the control valve. Other preferred embodiments of an inventive hydraulic motor are given in the sub-claims, which depend directly or indirectly on claim 1. In general and independently of the operational conditions, the pressure in the low pressure line shows a constant pressure level, though, sufficiently high to ensure a reliable control at least in the part-load operational range of a hydraulic motor. In general, a drive mechanism of a hydraulic motor relieves hydraulic fluid supplied at high pressure of varying levels, to a largely invariant low pressure level, thereby providing mechanical power, which in turn depends on the pressure level of the high pressure.

The objective on which the invention is based is also solved by a hydraulic pump according to claim 8. Preferred embodiments of the inventive hydraulic pump are given in the sub-claims directly or indirectly depending on claim 8.

In the state of the art, at least for hydraulic motors, hydraulic fluid from the high pressure line is usually used for controlling the displacement volume in order to be able to regulate or control a drive mechanism of a hydraulic machine in all operational conditions, in which a hydraulic machine can be. For hydraulic pumps, normally a charge pressure is used for this purpose, which is generated by a separate charge pump. For this purpose, for example in hydraulic pumps, the level of the charge pressure and the size of the servo piston surfaces are matched such that a reliable adjustment of the displacement volume of the hydraulic pump is ensured over the whole displacement range. This cannot be ensured sufficiently with a servo displacement unit of hydraulic motors which are fed by low pressure. For this reason, high pressure from the working lines is usually used in hydraulic motors in order to be able to provide the displacement volume adjustment at any time with hydraulic fluid at a sufficient high pressure level. This leads to the disadvantages already mentioned above.

However, in order to control the displacement volume of a drive mechanism of a hydraulic motor and the resulting rotational speed, high pressure is only necessary if the displacement, i.e. the displacement volume of the drive mechanism, is in the range of the maximum performance of the hydraulic motor, or if a rapid, time quick adjustment of the displacement volume is necessary. For all other operational conditions, a high level of control pressure is generally not necessary. Hence, according to the invention, hydraulic fluid under pressure from the low pressure line is used for hydraulic motors in part-load operational conditions. By doing this, it is achieved on one hand that the control pressure remains generally constant, even if the high pressure level in the hydraulic motor fluctuates. This leads to a control which is more predictable, more reliable and more constant, which is preferable, in particular in the application of a hydraulic motor in a hydraulic drive with automotive control. On the other hand in many operational conditions un-necessary leakage is avoided, which occurs when pressurizing the control unit and the servo displacement with high pressure.

However, if a hydraulic machine is to be adjusted rapidly in its displacement volume or if the same is operated near its maximum displacement volume and with high load, the low pressure is often not sufficient for its control. This is also valid for hydraulic pumps, which are generally adjustable over the whole adjustment range by means of a charge pressure; however, for instance in emergency situations, a quick displacement is often not achievable or the displacement with charge pressure is too slow.

Therefore, in a preferred embodiment of the invention the hydraulic motor or the hydraulic pump is provided with a switching valve, which also is hydraulically connected with the inlet of the control valve. By means of this switching valve, hydraulic fluid under pressure from the low pressure line, the charge pressure line or the high pressure line can be directed to the control valve according to a signal set by the electronic control unit. By means of the control valve in accordance with the electronic control unit, hydraulic fluid under high pressure is forwarded to the servo adjustment unit for a controlled displacement of the displacement volume of the hydraulic motor. Further preferably the switching valve is designed so as to be integral with the control valve. In this way, a particularly compact design and low material requirement can be achieved. Hence, an inventive hydraulic motor or an inventive hydraulic pump can be controlled reliably with hydraulic fluid under high pressure as needed and according to the operational conditions by means of the switching valve.

The control spool of inventive hydraulic machines is actuable preferably by means of a first actuator, which, for instance, is operable by means of a control signal of an electronic control unit. The switching valve too can be actuated by means of the first actuator, in particular if the switching valve is integrated in the control valve.

Preferably, the first actuator actuating the control valve is operable by means of an electronic control and an electric control signal, which is transformed by the first actuator into a corresponding force acting on the control valve spool. For this purpose, further preferably, proportional solenoids are used, which displace the control valve spool according to a control current, which is set by the electronic control unit. By means of such a displacement of the control spool, the force balance at the servo piston can be influenced hydraulically according to the setting of the electronic control unit. For this purpose the servo displacement unit preferably comprises a servo cylinder, which is divided into two chambers by means of a servo piston. In general, when displacing the servo piston in the servo cylinder, one servo chamber of the servo displacement unit is filled with hydraulic fluid and hydraulic fluid is discharged from the other servo chamber. The displacement of the servo piston is transferred by means of a displacement element to the drive mechanism of the hydraulic motor, by means of which the drive mechanism is adjusted in its displacement volume.

From this it can be seen that the more constant the pressure at the inlet side of the control valve, the more predictably and calculably it is possible to fulfil a demand of the electronic control unit to the first actuator and, hence, to the control valve in terms of its timing. The inventive use of constant low pressure or, respectively, of charge pressure as control pressure—at least with regard to the high pressure—results in the inventive power control of hydraulic machines being simpler and easier to be calculated in its time response as it is the case in commonly known controls. Each fluctuation in the level of a high pressure used as control pressure may be forwarded as servo pressure to the servo displacement unit and, hence, to the displacement volume adjustment. As already explained above, in common hydraulic motor control systems the high pressure depends on the load imposed on the hydraulic motor. In hydraulic pumps, constant pumps are used commonly as charge pumps and the charge pressure generated is limited by means of a pressure relief valve. Hence, every load condition results according to the state of the art in different adjustment parameters for the displacement volume of the hydraulic motor to be adjusted. This means also that the adjustment force generated by the servo pressure is higher, the higher the hydraulic fluid pressure which is being forwarded to the servo displacement unit. This also means that in common servo displacement units known from the state of the art, the adjustment speed depends on the level of the pressure forwarded to the servo displacement unit. Furthermore, in high pressure systems known from the art, the counterforce on the side of the servo cylinder on which hydraulic fluid is discharged is normally relatively high, which has a negative effect on the level of adjustment speed.

This is not the case with inventive adjustable hydraulic machines. At least in the constant load or in the partial load range of the hydraulic machine and by using hydraulic fluid under low pressure or charge pressure for the supply of the servo displacement unit, not only the adjustment speed remains largely constant due to the generally constant pressure, while the load is variable; also for each requested displacement volume a single signal value can be assigned in a more definite manner, for instance a single control power value. This is detectable not only in drive comfort but also in reduced re-adjustment response, in particular that of a hydraulic motor, making its control more reliable and steadier. Thereby, the invention can be realized in proportional as well as in two point control units having displacement angle sensors or other suitable displacement detectors.

Furthermore, it is achieved by means of the inventive hydraulic machines that adjustments—increase or reduction of the displacement volume—can be performed quicker as it is the case in the state of the art. This is due to the fact that according to the invention in the constant or partial load operation both servo chambers comprise hydraulic fluid under low pressure or charge pressure; in case of a intentional (quick) adjustment of the displacement volume, only one of the two servo chambers can be loaded with hydraulic fluid under high pressure, wherein the corresponding other servo chamber comprise hydraulic fluid under essentially lower pressure. Via this pressure difference a high adjustment force is created to act on the servo piston such that a quicker adjustment of the displacement volume can be achieved as it is the case if both servo chambers are loaded with largely the same pressure. If the demanded displacement volume is reached, a pressure balance on both sides of the servo piston is re-established, preferably at low pressure level. If the control valve is controlled by means of an electronic feedback of the displacement, the control valve spool is commanded back to the centered position or to the initial position after the desired displacement volume is reached.

Needless to say that the inventive hydraulic machine adjustment can be used also in operational conditions in which adjustment forces acting on the servo piston are necessary, which can be achieved only with supply of hydraulic fluid under high pressure to the servo displacement unit. Here it is ensured by means of the switching valve that hydraulic fluid loaded with high pressure is forwarded accordingly to the servo displacement unit via the control valve, whereby here also the servo chamber, which is not loaded with increased servo pressure, is fluidly connected to an area with low hydraulic fluid pressure. This also ensures an agile and quick displacement volume adjustment in operational conditions of the hydraulic machine, in which high torques are required from the same.

The actuation of the switching valve for switching whether low pressure or high pressure should be used as control pressure, can be done at one's convenience mechanically, pneumatically, electrically, or hydraulically; the same applies for the actuation of the control spool. In an alternative embodiment of the invention, the switching valve is operable by means of a pressure relief valve, which opens a connection line, if a predefined pressure value in the high pressure line is exceeded and pressurizes a front face of the control spool or a front face of the switching valve spool with hydraulic fluid under pressure such that hydraulic fluid under high pressure can be forwarded to the servo displacement unit by means of the control valve. Further preferably, the switching valve and/or the actuation device is controlled by means of a switching signal of the electronic control unit.

In general, the control of the displacement volume adjustment is done such that pressure from the low pressure line or from the high pressure line is forwarded via the control valve and the servo pressure line to the servo piston according to a signal of the electronic control unit. Thereby, the control valve guides hydraulic fluid under low pressure or charge pressure or under high pressure to the servo pressure line until the commanded displacement volume is adjusted at the hydraulic motor and until the same is in its force-balanced initial position again, in which a forwarding of hydraulic fluid under pressure to the servo displacement unit is interrupted. Thereby, the pushback of the control valve spool to its initial position is carried out in a proportional hydraulic machine successively by the displacement of the servo piston; in a 2-point machine it is carried out by means of the displacement detection and by means of setting a correspondent control signal, when the commanded displacement is reached.

With regard to the inventive method mentioned in independent claim 12, the problem mentioned above is solved in that way that a hydraulic motor adjustable in its displacement volume, comprising a low pressure line, a high pressure line and also an electronic control unit as well as a servo displacement unit, is adjusted in its displacement volume by means of displacing according to a control signal of the electronic control unit a control spool arranged in a control valve. By doing this, the hydraulic fluid under pressure is forwarded from the outlet side of the control valve to the servo displacement unit via a servo pressure line. The hydraulic fluid under pressure is applied to a servo piston within the servo displacement unit and displaces in a controlled manner the displacement volume of the hydraulic motor by means of a displacement element. For this purpose, hydraulic fluid under pressure from the low pressure line is supplied to the control valve at the inlet side.

According to the inventive method, hydraulic fluid under pressure from the high pressure line is supplied to the control valve of the hydraulic machine, if a predetermined threshold value for the control signal is exceeded or if an additional control signal is generated by the electronic control unit. In this cases, the increased or forwarded control signal causes a switching valve to direct hydraulic fluid under pressure from the high pressure line to the servo pressure line and, hence, to the servo displacement unit via the control valve such that the displacement of the servo piston is done proportional to the level of the control signal. In a 2-point controlled motor having a proportional control valve and a displacement sensor, the control signal to a control spool operating the actuator is maintained as long as the commanded displacement volume is reached.

According to the invention, it is possible to achieve a more predictable, quick and reliably reacting control of the operational behavior of a hydraulic motor being equipped for this purpose. Furthermore, varying requirements to the rotational speed and the performance of the hydraulic motor can be fulfilled optimal with minimum control effort.

In operation with partial load and with relatively "slow" performance adjustments, pressure fluid under low pressure is used for controlling the displacement unit of the hydraulic motor. By doing this, the displacement unit is controllable more exact and more predictable because pressure fluctuations in the high pressure area obviously are not an issue with low pressure control. Further, power losses due to leakage are reduced due to the low pressure level in the servo chambers. From the explanations above, a person skilled in the art understands that for hydraulic machines in general the inventive method is applicable analogously also to hydraulic pumps as well as to hydraulic motors, insofar it relates to the inventive high-pressure boosting for the adjustment of hydraulic machines.

The application of high pressure fluid in the servo displacement unit is often necessary only for a short time and only under specific operational conditions; for example if the control requires increased pressures, in particular for the quick displacement of the servo piston, for instance with big deviations from a target value. If this is the case, the control opens a connection to the working line conducting high pressure preferably for a short time such that the servo cylinder is provided with pressure fluid under high pressure. This enables a quick "boost"-like increase of the control or of the servo pressure, this means a quick adjustment of the hydraulic machine if necessary. After the displacement has been realized, it can be switched again to low pressure operation in order to maintain the adjusted power, respectively the displacement of the hydraulic machine. The electronic control unit provided for emitting correspondent control signals to the actuators of the control spool and/or of the switching unit prompts, if necessary, to send a corresponding switching signal to the actors based on signals from sensors, for example of a rotational speed sensor, a displacement angle sensor, or a power sensor. Thereby, the manual generation of a switching signal, for example by an operator is encompassed by the inventive idea as well as the generation of a switching signal by software algorithms.

In normal low pressure or charge pressure operations of the displacement unit, an amplifying (boost) of the pressure applied to the servo piston can be desired and/or be necessary in concrete load situations. This, for instance is the case, if the hydraulic machine is at or near a maximum displacement angle and under high load, because of this the pressure is high. If this is case, the hydraulic machine cannot be adjusted solely with low pressure or charge pressure control. In this case, the pressure is not sufficient to force the hydraulic machine from a maximum displacement to a moderate position of displacement in which the hydraulic machine runs in partial load conditions, for example. The same is valid analogously if the control pressure is not sufficient to realize quickly enough a necessary displacement. By the help of a high pressure supply on demand to the servo cylinder, which corresponds to an enhancement of the force on the servo piston, the displacement element, for instance a swash plate or a cylinder block, can be displaced quicker and more powerful as it is possible with systems known from the state of the art. On the other side, low pressure or charge pressure control is mostly perfectly sufficient if a hydraulic driven machine is merely driven in a plane. In particular, switching from control pressure operation to high pressure control operation can be necessary also, if quick load alternations of a working machine with hydraulic drive is required, for instance in an engaging and/or disengaging operation of a hydraulic motor.

BRIEF DESCRIPTION OF THE DRAWINGS

The invention is disclosed in the following in a more detailed way by the help of a schematic sequence diagram and by the help of embodiments depicted in the Figures. Thereby, the inventive idea is not limited to the embodiment shown in the Figures and encompasses hydraulic motors as well as hydraulic pumps, in particular of the axial and the radial piston type. It is shown in.

DETAILED DESCRIPTION

Figure 1:
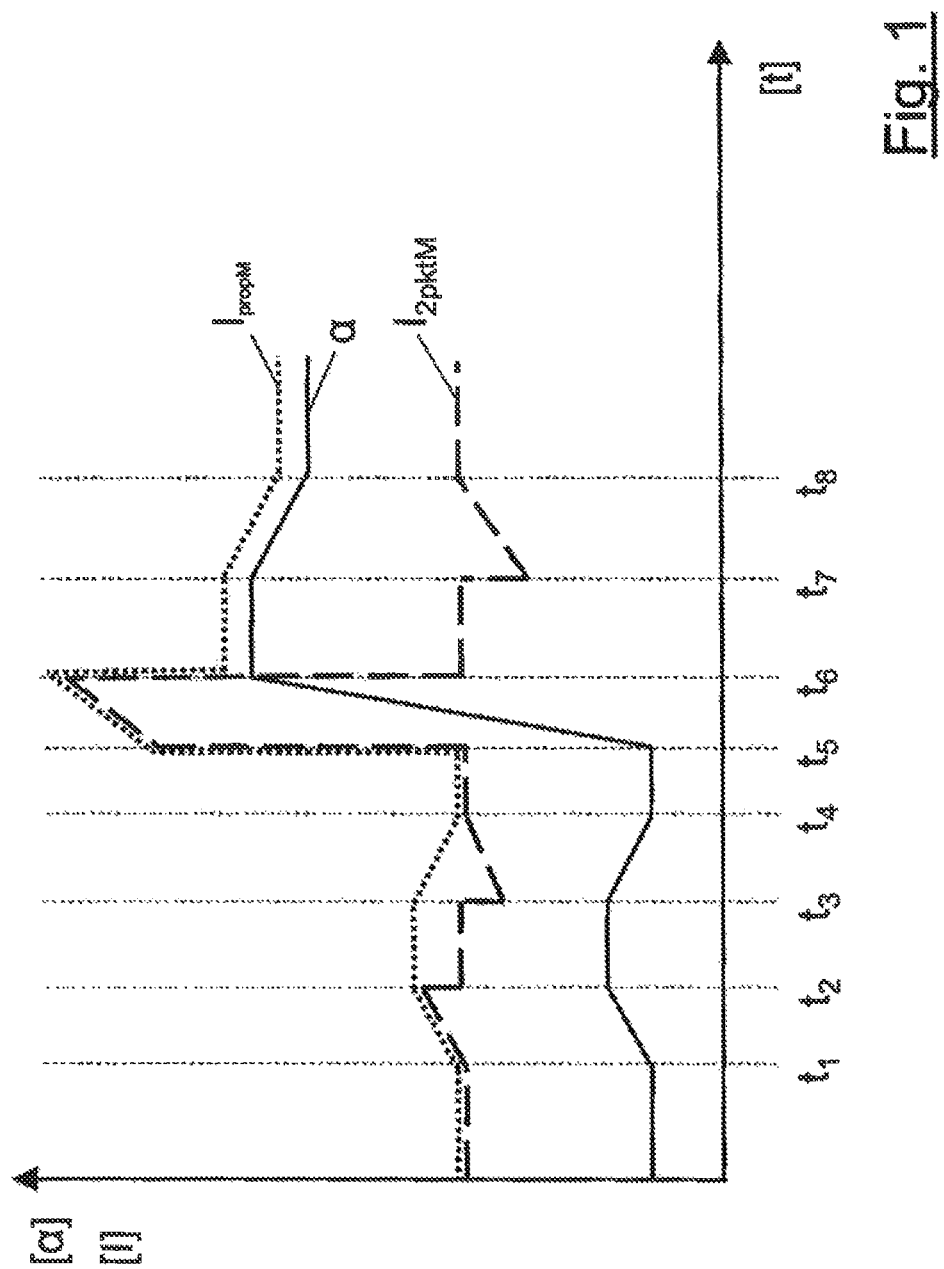
FIG. 1 is a schematic sequence diagram for inventive displacement volume adjustments of inventive hydraulic motors, for example.

FIG. 1 shows exemplarily a timing of control signals for an actuator in form of a control current $I_{propM}$ to a proportional controlled hydraulic motor, and in form of $I_{2pktM}$ to a hydraulic motor with 2-point control and displacement sensor. The hydraulic motors are realized in the bent axis or swash plate type, for example. The control current commands a control valve to change a displacement angle setting by means of an actuator of the exemplarily selected axial piston hydraulic motors. At the points of time $t_1$ to $t_4$ the adjustment of the displacement angle $\alpha$ is performed for both hydraulic motors with a relatively low control current and by applying hydraulic fluid from the low pressure line. Accordingly to this, the changes run flat, here the increase, respectively the reduction of the displacement angle between the points of time $t_1$ and $t_2$ and between $t_3$ and $t_4$.

At the point of time $t_5$ a higher control signal is set, whereby, additionally to the control valve a switching valve, for example integrated in the control valve, is actuated and hydraulic fluid from the high pressure line is directed by means of the control valve to the servo displacement unit. As it can be seen from the diagram, the adjustment of the displacement angle $\alpha$ provoked thereby is done essentially quicker, whereby, at the same time, a bigger absolute change of the displacement angle $\alpha$ is achieved also. The displacement volume adjustment of the hydraulic motor is performed on the one hand accelerated and on the other hand more powerful, as this can be achieved with low pressure level in the servo displacement unit. The displacement angle adjustment, which is initiated at the point of time $t_5$ is "boosted" with high pressure level according to the invention. For this purpose, by operating the switching valve it is enabled that hydraulic fluid form the working line of the high pressure side is directed by means of the control valve to the servo displacement unit as servo pressure. Such a high pressure "boosted" adjustment of the hydraulic motor is desired, for example if a hydraulic motor should be adjusted quickly, e.g. for a disengaging operation.

Figure 2:
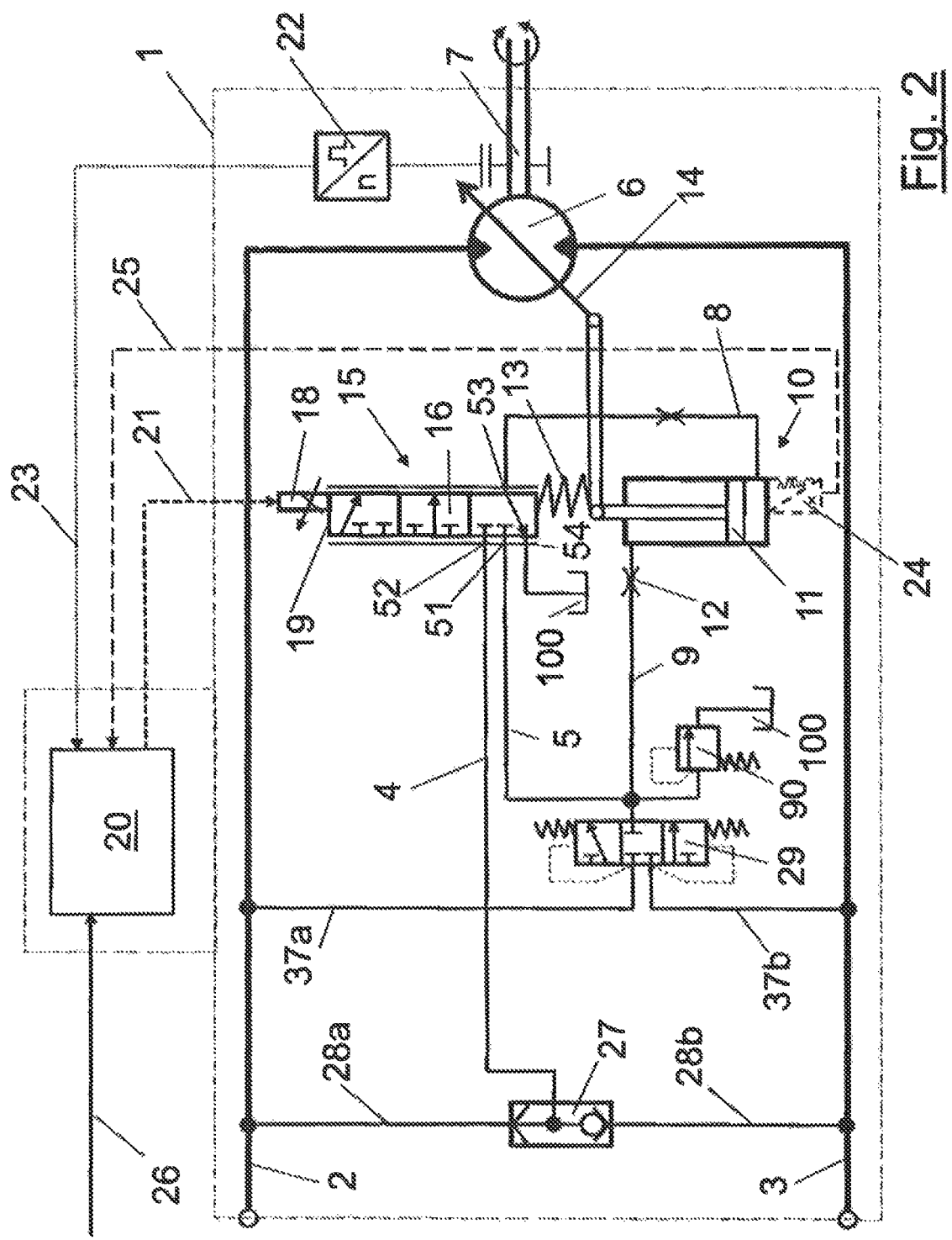
FIG. 2 is an adjustable hydraulic motor according to a first embodiment of the invention in a schematic representation.

Exemplarily, for the practicability of these displacement volume adjustment possibilities according to the invention with low and high pressure, an adjustable hydraulic motor 1 of the proportional type is shown in FIG. 2 in a schematic view. The hydraulic motor 1 shows two working lines 2 and 3, one of which serves for the supply of hydraulic fluid under high pressure and the other one for discharging hydraulic fluid under low pressure. Depending on which of the working lines 2, 3 is loaded with pressure fluid under high pressure in the driving operation, the rotational direction of driving mechanism 6 and the driving shaft 7 connected therewith is defined. The corresponding other working line discharges hydraulic fluid under low pressure to a hydraulic pump, for example. This is done preferably in a closed circuit, however not shown.

The displacement volume of hydraulic motor 1 is controllable by means of an external electronic control unit 20 according to a command signal 26. For this purpose the electronic control unit 20 controls and monitors the flow rate volume through hydraulic motor 1 and adapts by means of suitable control signals the displacement volume flow to target value commands set by an operator, for example. A displacement angle sensor 24 and/or a rotational speed sensor 22 can be connected to the electronic control unit 20 being connected to the electronic control unit 20 via a displacement angle signal line 25 or via a rotational speed signal line 23, respectively.

For changing the rotational speed of hydraulic motor 1, the displacement of hydraulic motor 1 is adjusted by means of a displacement element 14 via a servo displacement unit 10 having a servo piston 11. In axial piston machines the displacement element 14 is a swash plate, for example, whose displacement angle is adjusted. In a hydraulic radial piston motor this can be an external ring, for example, which is displaced eccentrically with respect to the driving shaft. A feedback spring 13 is connected to displacement element 14 as well, which serves to feedback the displacement. Servo displacement unit 10 is connected to an outlet of control valve 15 via a servo pressure line 8 and is supplied with pressure fluid under servo pressure by means of the control valve 15. A servo pressure line 9 having a servo throttle 12 arranged within leads from the servo cylinder to a low pressure valve 29 which is connected to working lines 2 and 3 of the hydraulic motor via lines 37a, 37b. Low pressure valve 29 is shifted high pressure-controlled such that the low pressure side of hydraulic motor 1 is always hydraulically connected to servo pressure line 9 and to a low pressure line 5, which leads from low pressure valve 29 to control valve 15.

Control valve 15 comprises a control spool 16 which is mounted longitudinally displaceable in a control cylinder and operable by means of an actuator 18, for example a proportional solenoid. On control spool 16 a feedback spring 13 acts too, biasing the control spool 16 in direction of its initial position in which the control spool 16 connects an outlet 54 of the control valve 15 to an area with low pressure, for example a tank 100. Depending on the magnitude of a set control signal, the control spool 16 opens or closes a first outlet 53 of the control valve 15 for forwarding pressure fluid to servo pressure line 8 which leads to servo displacement unit 10 and opens or closes mirror-inverted an outlet 54 to an area with low hydraulic fluid pressure. By doing this, the position of servo spool 11 in the servo cylinder and, consequently the position of the displacement element 14 of hydraulic motor 6 and, finally the displacement volume of hydraulic motor 1 is determined. On one hand, control valve 15 is fed via low pressure line 4 connected with a first inlet 51 of control valve 15. On the other hand, in the operational condition according to FIG. 1, hydraulic fluid under high pressure is directed from working line 2 via a line 28a and the double-sided check valve 27 to high pressure line 4, which is connected with a second inlet 52 of control valve 15.

The structure and operation of the hydraulic motor described so far corresponds only in so far to the common state of the art as the supply of the control valve is realized by means of a second inlet 52 with pressure fluid from the high pressure side of hydraulic motor 1, i.e. from the working line 2 or 3, which is loaded with high pressure. The general way of operation of a control unit for the displacement of the displacement volume of an adjustable hydraulic motor is known to a person skilled in the art and is assumed to be known for the scope of this invention description.

However, according to the invention, different from the state of the art, a further first inlet 51 is provided at control valve 15. This first inlet 51 can be connected to working lines 2 or 3 via a low pressure line 5, the low pressure-switching valve 29 and the lines 28a and 28b. For this purpose, the low pressure-switching valve 29 switches autonomously in a switching position, in which the corresponding low pressure conducting working line 3 or 2 is connected hydraulically with the low pressure lines and the first inlet 51 of the control valve 15. In the embodiment of the invention depicted in FIG. 2, the control valve 15 is provided according to the invention with pressure fluid under low pressure over the first inlet 51 as well as with pressure fluid under high pressure over the inlet 52. Hence, control valve 15 can receive the servo pressure to be directed to the servo displacement unit 10 via the servo pressure line 8 either from the high pressure or the low pressure area of hydraulic motor 1. In further difference to the state of the art, inside the servo displacement unit on the servo piston side which is not supplied by means of the control valve 15 with hydraulic fluid, low pressure is present. According to the embodiment depicted in FIG. 2, the second servo piston side is fluid-connected with the outlet of the low pressure-switching valve 29 via a second servo pressure line 9. Thereby, a throttle 12 can be arranged in the first servo pressure line 8 as well as in the servo pressure line 9.

Starting from the operational situation, which is shown in FIG. 2, and in which driving mechanism 6 of hydraulic motor 1 is in its minimum displaced position, for instance, in the following below, the inventive low pressure control of driving mechanism 6 of hydraulic motor 1 will be explained. As mentioned already above, hydraulic fluid under low pressure is directed via the low pressure valve 29 to the first inlet 51. By means of actuator 18 control spool 16 of control valve 15 can be displaced proportional to a control signal of the electronic control unit 20, which control signal is guided via control signal line 21 to actuator 18, such that control valve spool 16 connects low pressure line 5 with servo pressure line 8 via inlet 51 and outlet 53. By doing this, servo piston 11 is loaded at its bigger front face with low pressure, at the same time its back face, for instance a ring face, is also loaded by low pressure. Due to the difference in face-size, servo piston 11 is displaced and swivels hydraulic motor 1, i.e. driving mechanism 6 to a bigger displacement volume, for instance by means of displacement element 14. At the same time of the servo piston displacement feedback spring 13 pushes back control valve spool 16 in direction of its initial position until force balance is established on both sides of the servo piston.

If a quick change of the displacement volume or if a quick adjustment/displacement of the hydraulic motor 1 in direction of its maximum displacement is required, servo piston 11 is loaded preferably with high pressure by which an increased servo displacement force is achieved. According to the invention this can be obtained by transmitting an increased control signal of the electronic control unit 20 to actuator 18. Actuator 18 displaces control valve spool 16 further in direction of servo displacement unit 10 such that high pressure being present at the second inlet 52 of control valve 15 can be directed via outlet 53 to servo line 8. Hence, by means of control valve 15 hydraulic motor 1 can be adjusted in its displacement volume in a low pressure-controlled as well as a high pressure-controlled manner. A relevant person skilled in the art detects that the single-side control shown in FIG. 2 can be transferred also according to the invention to a two-side low pressure/high pressure-control.

Electronic control unit 20 of hydraulic motor 1 can be provided in further embodiments of the invention with a displacement angle sensor 24 and/or with a rotational speed sensor 22. Both sensors are connected via a rotational speed signal line 23, respectively via a displacement angle signal line 25 with electronic control unit 20. The function and operational mode of such sensors is known to a person skilled in the art such that further explanations hereto are omitted.

All the reference signs used in FIG. 2 are used also in the following Figures for indicating similar structural features.

Figure 3:
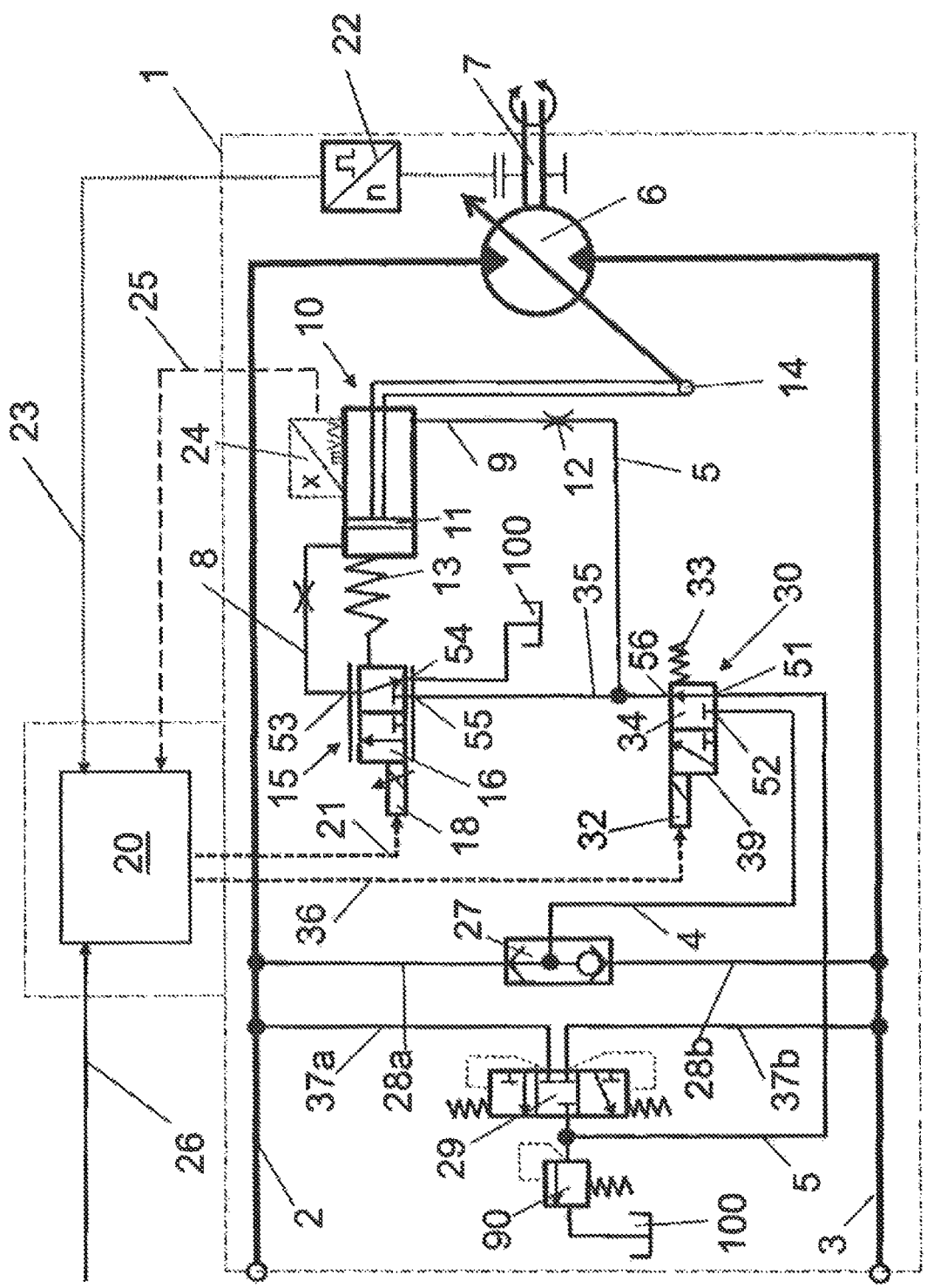
FIG. 3 is a further embodiment of a hydraulic motor according to the invention in a schematic representation.
Figure 4:
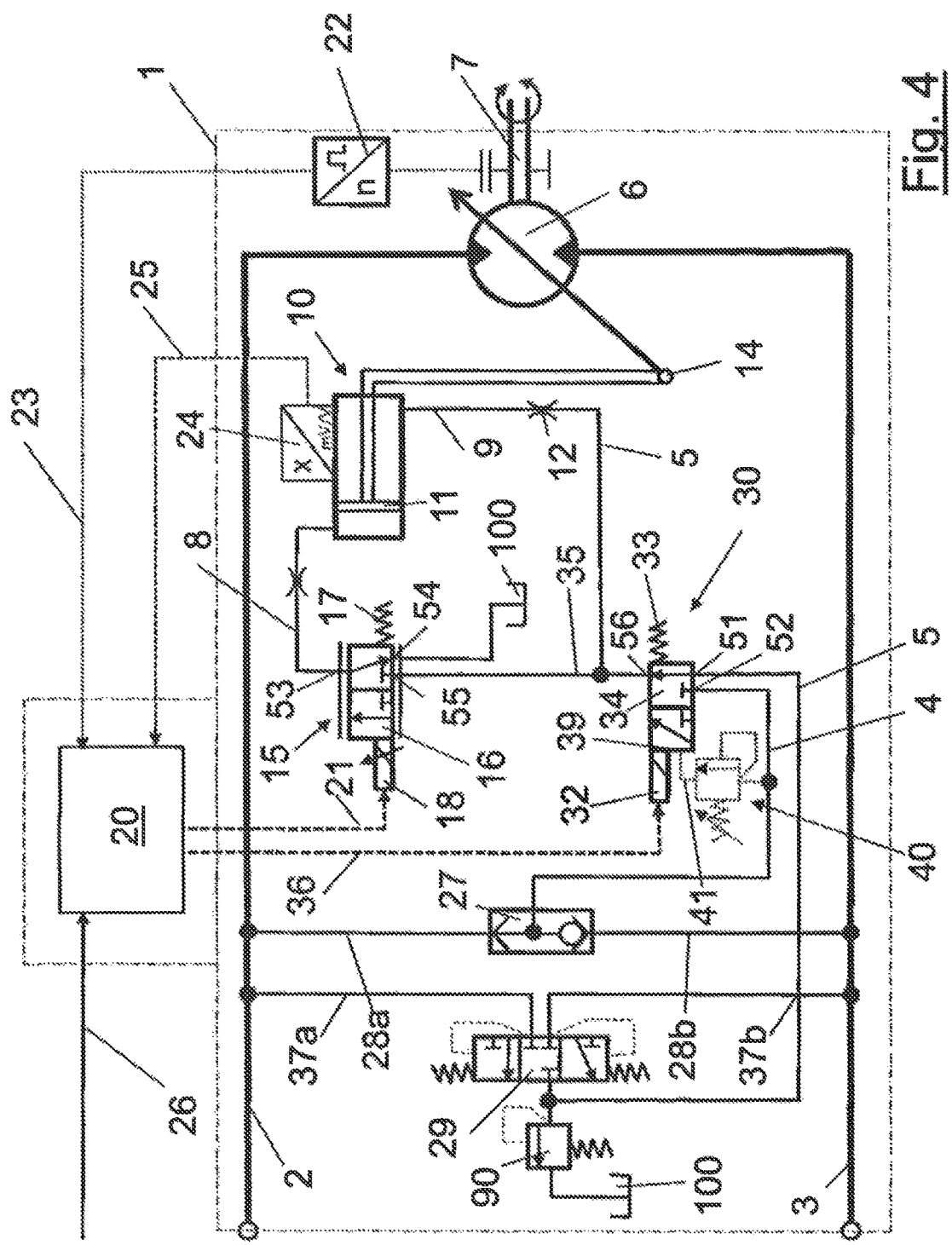
FIG. 4 is an alternative of the embodiment of the invention of FIG. 3 in a schematic representation.

FIG. 3 shows a further embodiment of an inventive control for a hydraulic motor 1. The installation corresponds largely to the one of the embodiment according to FIG. 2 with the difference that the high pressure line 4 and the low pressure line 5 of FIG. 2 are conducted via a separate switching valve 30 to control valve 15. In the embodiment of FIG. 2 the switching valve 30 is integrated into the control valve. This is not the case in FIG. 3. According to FIG. 3, low pressure from the low pressure line 5 is present at an inlet 51 of the separate switching valve 30 and high pressure from the high pressure line 4 is present at an inlet 52. Depending on the position of switching valve 30, hydraulic fluid under high pressure or under low pressure can be directed optionally to an inlet 55 of control valve 15 via an outlet 56 of switching valve 30. For this, switching valve 30 in FIG. 3 comprises a switching actuator 32 which acts on a front face 39 of switching valve spool 34. At the other front face a switching valve spring 33 is arranged, which counteracts to switching actuator 32. Additionally, the outlet of a pressure relief valve can be connected to front face 39; this is shown in FIG. 4 by a dotted line.

According to a signal provided by the electronic control unit 20 via a signal line 36, switching valve 30 is provided to direct either hydraulic fluid under pressure from the high pressure line 4 or from the low pressure line 5 to a control pressure line 35 which leads from an outlet 56 of the switching valve 30 an inlet 55 of control valve 15. In this manner by means of the electronic control unit 20 it can be commanded via the separate switching valve 30 which pressure—high pressure or low pressure—should be used for providing a servo pressure; and this on both sides of the servo displacement unit. With the embodiment of the invention shown in FIG. 3 it is possible to adapt the control of the servo displacement unit 10 of hydraulic motor 1 in different and alternating conditions in simple way, as the switching signal guided to switching actuator 32 via signal line 36 can be a simple on/off signal. At the same time, hydraulic motors already in operation can be retrofitted with the inventive control, in that a switching valve 30 is arranged upstream of the existing control valve 15 and in that a further inlet is connected with the low pressure side of the hydraulic motor, for instance by means of a low pressure-switching valve 29. In this way the inventive control of a hydraulic motor 1 can be implemented in already existing hydraulic working machines.

By arranging switching valve 30 separately, the functionality of the hydraulic motor 1 shown in FIG. 2 can be extended to the one of hydraulic motor 1 shown in FIG. 3, and can be adjusted in a high pressure-amplified ("boosted") manner in both directions, i.e. in direction of increase as well as in direction of reduction of the displacement volume. If one assumes theoretically that switching valve 30 of the embodiment shown in FIG. 3 is arranged such that hydraulic fluid under high pressure is guided to the outlet 56 of switching valve 30, a boosted destroking of driving mechanism 6 can be performed via second servo line 9 and servo displacement unit 10, for instance, as servo line 8 as wells as servo line 9 conducts hydraulic fluid under high pressure. By suitably commanding control valve spool 16 it is possible to discharge hydraulic fluid by means of control valve 15 via servo line 8 to an area with low pressure, for example, i.e. to a tank 100 in a controlled manner, for example.

In this embodiment servo piston 11 of servo displacement unit 10 can be loaded from both sides with pressure fluid under the control pressure which is forwarded by switching valve 30. By means of the control pressure line 8 or the servo pressure line 9 and depending on the intended displacement direction, hydraulic fluid can be conducted to the servo cylinder in a controlled manner, wherein via the corresponding other line hydraulic fluid displaced from the servo chamber can be discharged.

In an alternative of the control unit of hydraulic motor 1, as shown in FIG. 4 in a dashed manner above of hydraulic line 4, a partial flow can be directed from the high pressure line 4 to a front side of the switching valve spool 34 via a pressure relief valve 40. By doing this, it can be achieved, depending on a limit pressure in high pressure line 4 that switching actuator 32 is supported by a pressure force resulting from connection line 41. If the high pressure in the high pressure line 4, i.e. in the working line conducting high pressure, increases above a certain pressure level, pressure relief valve 40 opens. This means at the same time that the hydrostatic drive, respectively the hydraulic motor, has to generate increased power. In this case the force acting on servo piston 11 and created by means of the low pressure often is too low to achieve a displacement volume change of hydraulic motor 1. With the help of the proposed pressure relief valve 40 according to FIG. 4, a threshold value for the displacement volume adjustment of driving mechanism 6 can be predetermined such that a further displacement volume increase could be performed only by the support of high pressure when the threshold value is exceeded. If the pressure in the high pressure conducting working line drops under this threshold pressure level of pressure relief valve 40, the displacement volume adjustment of driving mechanism 6 should be performed low pressure-feeded again.

Hence, such a design according to FIGS. 3 and 4, is suitable in particular for such hydraulic motors, in which the positive displacement as well as the negative displacement should be performed controlled and, eventually, high pressure-amplified ("boosted"). The design is further suitable for hydraulic motors in which a change of rotational direction can be done by means of the servo displacement unit 10 without a change in the flow direction in the working lines 2 and 3 being necessary. Further, a displacement angle sensor 25 can be arranged at the servo displacement unit 10 of this design and can be connected to the electronic control unit 20 via displacement angle signal line 25, as this is common practice with 2-point motors. As above, the current rotational speed of hydraulic motor 1 is detected by rotational speed sensor 22, for example, and is transmitted to electronic control unit 20 via rotational speed signal line 23 as well.

Figure 5:
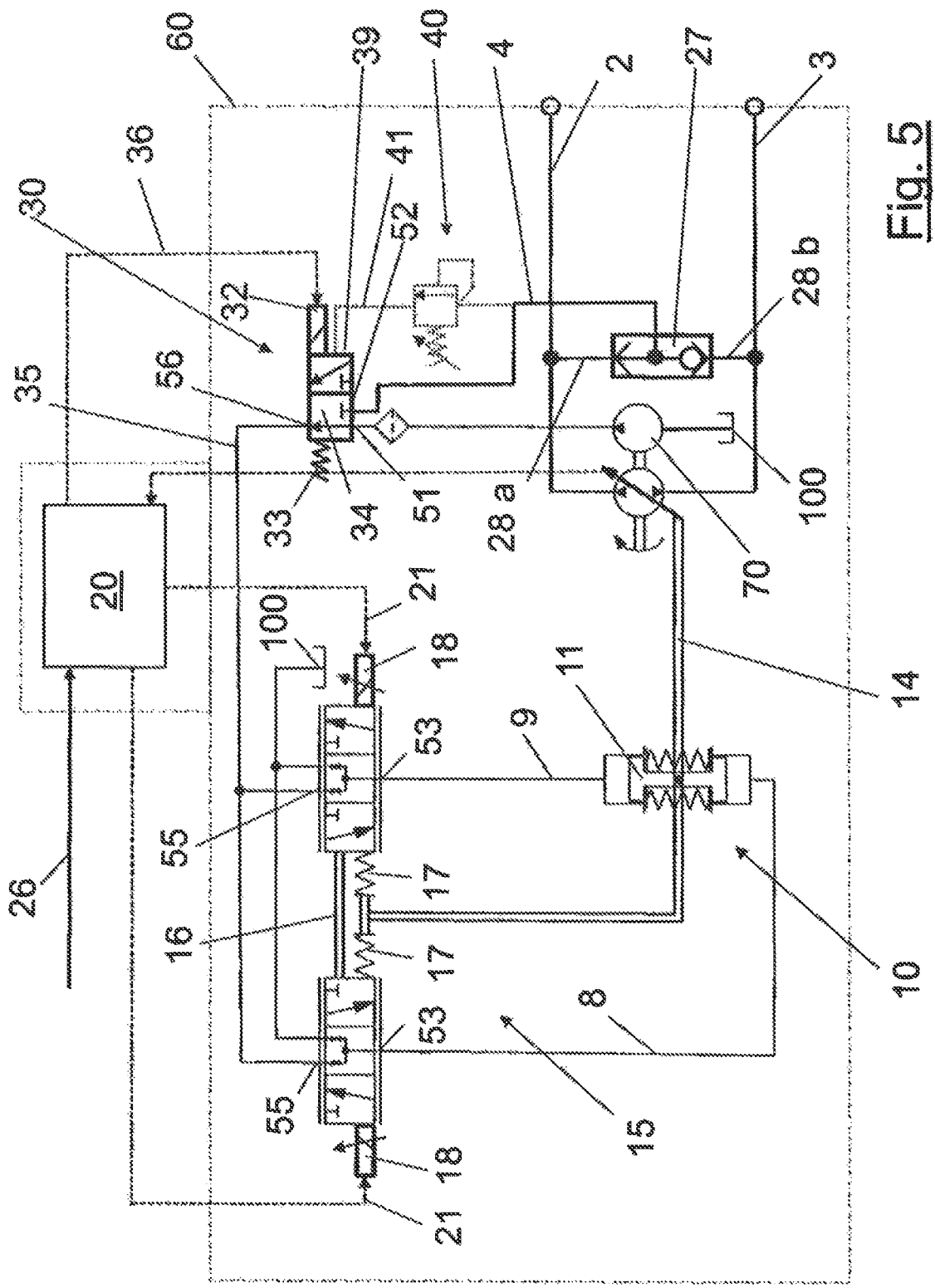
FIG. 5 is a hydraulic pump adjustable according to the invention in a schematic representation.
Figure 6:
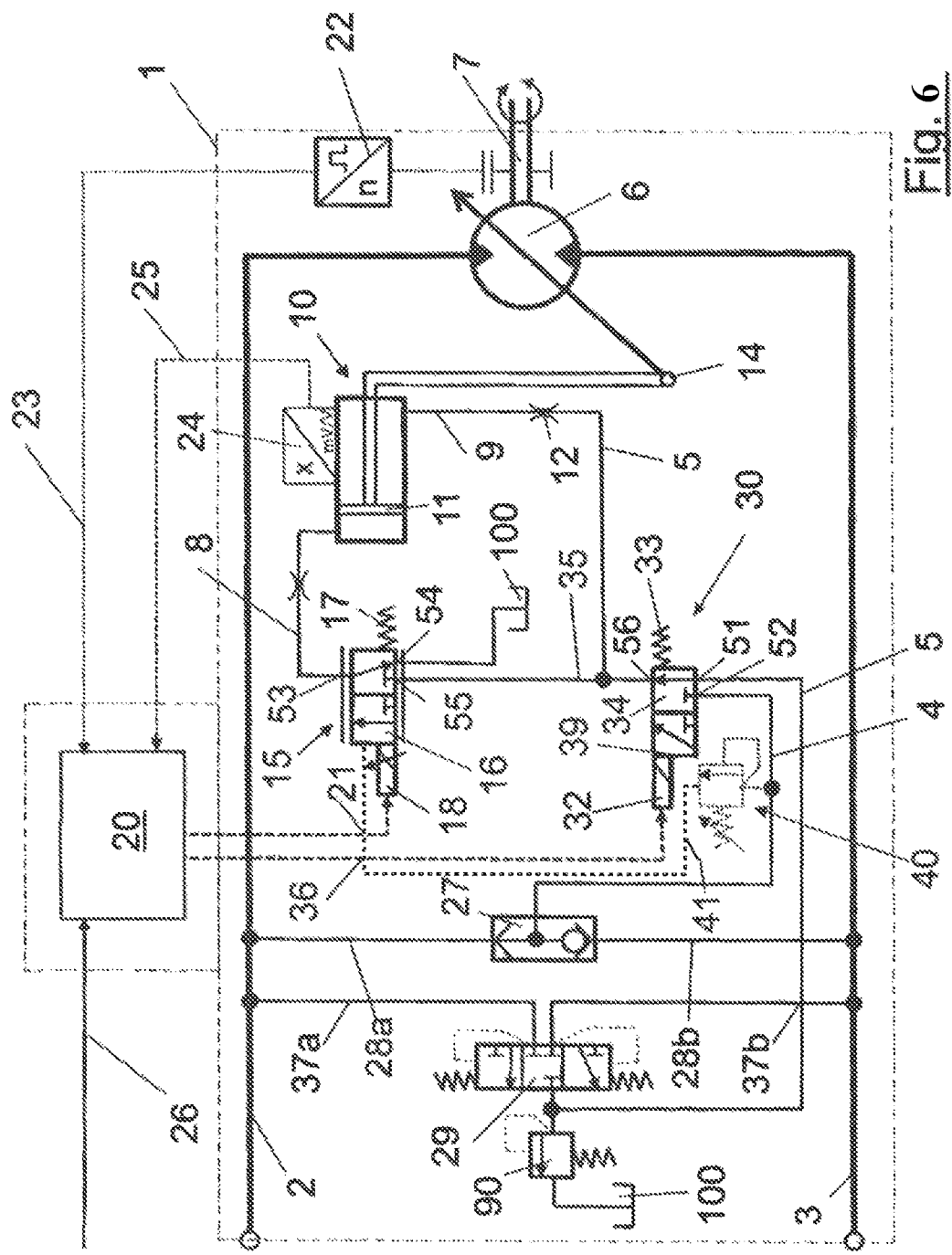
FIG. 6 is an alternative of the embodiment of the invention of FIG. 3 in a schematic representation.

FIG. 5 shows exemplarily a possible embodiment of the inventive high pressure adjustment for a hydraulic pump 60 adjustable in two directions. For simplification reasons of the graphic representation, the same reference signs are used for analog components which are shown already in FIGS. 2 to 4. An inventive hydraulic pump 60, as it is shown in FIG. 5, comprises a control valve 15 having a control valve spool 16. Here, control valve spool 16 is displaceable longitudinally slidably in both axial directions by means of two actuators 18. Via servo pressure lines 8 and 9 which are connecting control valve 15 with a servo displacement unit 10, a servo piston 11 can be loaded with hydraulic fluid under pressure in the commonly known manner. Hydraulic fluid provided to control valve 15 via a control pressure line 35 is provided either by means of a charge pressure pump 70 or is taken out of the working line which is conducting high pressure by means of a check valve 27. For this purpose, according to the invention, and according to the requirements of hydraulic pump 60, a switching valve 30 is switched suitably by means of an electronic control unit 20 and a switching actuator 32. In the operational condition shown in FIG. 5, switching valve 30 of inventive hydraulic pump 60 is in that position in which hydraulic fluid from charge pump 70 is forwarded to control valve 15. This corresponds to the known supply of a control valve for hydraulic pumps in the state of the art.

If the pressure of charge pump 70 does not suffice anymore or if hydraulic pump 60 should be adjusted quicker as it is possible with the charge pressure of charge pump 70, the electronic control unit 20 commands switching actuator 32 to actuate switching valve spool 34 of switching valve 30 such that hydraulic fluid from the high pressure line which leads from check valve 27 to switching valve 30 is directed to control valve 15. By using high pressure a more powerful and eventually quicker adjustment of hydraulic pump 60 is possible, i.e. a boosted adjustment of hydraulic pump 60. Such a boosted adjustment of a hydraulic pump can be applied, for instance if in a very short time very high performances are required from the hydraulic pump, and also if the hydraulic pump should be destroked back to zero very quickly in a kind of an emergency switch-off. For sure, a person skilled in the art detects further application possibilities for such a boosted adjustment of a hydraulic pump according to the invention.

A further advantage for hydraulic pumps when using the inventive high pressure adjustment consists in that servo pistons used in the adjustment of hydraulic pumps can be designed smaller as this was possible so far. By using high pressure, a necessary high adjustment force can be obtained also with smaller servo piston faces. By doing this, the necessary installation space for the servo adjustment can be reduced significantly.

Altogether with the inventive method for adjusting hydraulic machines with low pressure or high pressure depending on the requirements on the hydraulic machines, a simple and robust, reliable control system is provided with which in operation, at least for partial load operation, high losses due to leakage can be avoided. Furthermore, the inventive system provides a control pressure supply which does not depend on pressure fluctuations within the hydraulic system. The invention rather provides a control system which provides across a big range, i.e. a big control pressure range, a reliable, simple commandable control of hydraulic machines by means of a constant pressure level.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A variable hydraulic motor comprising:
   two working lines, from one of which a high pressure line and from the other one a low pressure line is branched off, and
   a control valve, within which a control spool is arranged movable by means of a first actuator, such that a servo displacement unit can be provided with hydraulic fluid under pressure via a servo pressure line arranged at the output side of the control valve such that the displacement volume of the hydraulic motor is adjustable in a controlled manner, and
   a switching valve, by means of which hydraulic fluid under pressure is guidable either from the low pressure line or the high pressure line to the servo displacement unit via the control valve and via the servo pressure line,
   wherein the inlet side of the control valve is connected to the low pressure line, and in that hydraulic fluid from the low pressure line can be forwarded to the servo pressure line via the control valve, and
   wherein the switching valve is connected to a pressure relief valve, the pressure relief valve being configured to open a connection line if a predefined pressure level in the high pressure line is exceeded, and wherein the connection line hydraulically connects the high pressure line with a front face of the control spool or a front face of a switching valve spool of the switching valve.

2. The hydraulic motor according to claim 1, wherein the control spool is displaceable by means of the first actuator according to a control signal of an electronic control unit.

3. The hydraulic motor according to claim 1, wherein the switching valve is switchable by means of a switching actuator and a signal set by an electronic control unit.

4. A variable hydraulic motor comprising:
   two working lines, from one of which a high pressure line and from the other one a low pressure line is branched off, and
   a control valve, within which a spool is arranged movable by means of a first actuator, such that a servo displacement unit can be provided with hydraulic fluid under pressure via a servo pressure line arranged at the output side of the control valve such that the displacement volume of the hydraulic motor is adjustable in a controlled manner, and
   wherein the spool includes means by which hydraulic fluid under pressure is guidable either from the low pressure line or the high pressure line to the servo displacement unit via the control valve and via the servo pressure line,
   wherein the inlet side of the control valve is connected to the low pressure line, and in that hydraulic fluid from the low pressure line can be forwarded to the servo pressure line via the control valve,
   wherein the inlet side of the control valve is connected to the high pressure line, and in that hydraulic fluid from the high pressure line can be forwarded to the servo pressure line via the control valve, and
   wherein the control valve is connected to a pressure relief valve, the pressure relief valve being configured to open a connection line if a predefined pressure level in the high pressure line is exceeded, and wherein the connection line hydraulically connects the high pressure line with a front face of the spool of the control valve.

5. The hydraulic motor according to claim 4, wherein the control valve is switchable by means of an actuator and a signal set by an electronic control unit.

6. A method for the controlled adjustment of the displacement volume of a variable hydraulic motor having a low pressure line and a high pressure line and having an electronic control unit and a servo displacement unit,
   wherein the adjustment of the displacement volume is made by the displacement of a control spool arranged in a control valve and by means of a first actuator according to a control signal of the electronic control unit such that hydraulic fluid under pressure can be conducted from the outlet side of the control valve via a servo pressure line to the servo displacement unit such that by means of the servo displacement unit the displacement volume of the hydraulic motor is adjusted in a controlled manner,
   wherein hydraulic fluid under pressure from the low pressure line is supplied to the inlet side of the control valve,
   wherein hydraulic fluid under pressure from the high pressure line is supplied to the inlet side of the control valve, if a predetermined threshold value for the pressure in the high pressure line is exceeded or a further control signal is generated by the electronic control unit that switches a switching valve such that hydraulic fluid under pressure from the high pressure line is conducted to the control valve, and
   wherein the switching valve is connected to a pressure relief valve, the pressure relief valve being configured to open a connection line if a predefined pressure level in the high pressure line is exceeded, and wherein the connection line hydraulically connects the high pressure line with a front face of the switching valve.

7. The method according to claim 6, wherein the displacement of the control spool is proportional to the level of the control signal.

8. A method for the controlled adjustment of the displacement volume of a variable hydraulic motor, the variable hydraulic motor comprising a low pressure line, a high pressure line, an electronic control unit, a servo displacement unit, and a control valve having a control spool arranged therein, the method comprising:

displacing the control spool by means of a first actuator according to a control signal of the electronic control unit such that hydraulic fluid under pressure can be conducted from the outlet side of the control valve via a servo pressure line to the servo displacement unit such that by means of the servo displacement unit the displacement volume of the hydraulic motor is adjusted in a controlled manner, wherein hydraulic fluid under pressure from the low pressure line is supplied to the inlet side of the control valve, wherein hydraulic fluid under pressure from the high pressure line is supplied to the inlet side of the control valve, if a predetermined threshold value for the pressure in the high pressure line is exceeded or a further control signal is generated by the electronic control unit that switches a switching valve such that hydraulic fluid under pressure from the high pressure line is conducted to the control valve, and wherein the switching valve is connected to a pressure relief valve, the pressure relief valve being configured to open a connection line if a predefined pressure level in the high pressure line is exceeded, and wherein the connection line hydraulically connects the high pressure line with a front face of the switching valve.

\* \* \* \* \*